United States Patent [19]

Korowitz et al.

[11] 4,417,303
[45] Nov. 22, 1983

[54] MULTI-PROCESSOR DATA COMMUNICATION BUS STRUCTURE

[75] Inventors: Simon Korowitz, Hatfield; Kurt R. Leichter, King of Prussia; Felix J. Houvig, Wayne, all of Pa.

[73] Assignee: Leeds & Northrup Company, North Wales, Pa.

[21] Appl. No.: 237,835

[22] Filed: Feb. 25, 1981

[51] Int. Cl.³ ............................................. G06F 15/16
[52] U.S. Cl. ................................................. 364/200
[58] Field of Search ........................ 364/200 MS File

[56] References Cited
U.S. PATENT DOCUMENTS 4,035,777  7/1977  Moreton .............................. 364/200
4,070,710  1/1978  Sukonick et al. .................... 364/200
4,124,890  11/1978  Vasenkov et al. .................. 364/200
4,320,457  3/1982  Tanikawa ............................ 364/200

*Primary Examiner*—Thomas M. Heckler
*Attorney, Agent, or Firm*—William G. Miller, Jr.; Harold Huberfeld

[57] ABSTRACT

A bus structure for the interconnection between a data bus capable of transferring a plurality of words and a local bus which can carry only one word. This structure includes latches for storing the plurality of words for simultaneous transfer over the data bus or for sequential transfer over the local bus as required. Control logic operates to perform the necessary control over this interconnection to effect the required operation.

3 Claims, 3 Drawing Figures

MULTI-PROCESSOR DATA COMMUNICATION BUS STRUCTURE

BACKGROUND OF THE INVENTION

The present invention relates to multi-processor data communications systems and more particularly to a structure for the data bus of such a system.

The invention is particularly applicable to microprocessor based controllers for the automatic control of processes where a relatively large number of control loops are involved and it is desired to have a distributed control system.

In a system environment which involves a multiprocessor shared resource configuration, the resource, such as a read only memory (RAM) or a programmed random access memory (PROM), must be put in communication with a selected one of the processors by way of a data bus in the priority ranking of the requesting units. The classical means for accomplishing the transfer of data between the processors and the resource or between the processors themselves involves the granting of access to the data bus to one of the processors with that processor retaining control for its complete data transfer. Thus, if a complete data transfer involved the transfer of three words, that is, three bytes of contiguous information, for example, and the transfer involves one word at a time, the time necessary to accomplish the transfer would include not only the time necessary to transfer sequentially the three bytes but also the time necessary to calculate the address of the second and third bytes. With such an arrangement a processor requesting access would have to wait not only during the sequential period in which the three bytes are transferred but also during the calculation phase. This, of course, slows down the data transfer and ties up the system resources.

The present invention provides a bus structure which avoids the disadvantages of the classical means for transfering multiple data words in multi-processor shared resource environments so that there will be an increased bus utilization and a decrease in the bus wait time.

SUMMARY OF THE INVENTION

In accordance with the present invention, a multi-processor based controller using a shared resource connected by way of a data bus to the processors provides a structure which organizes the bus and memory with a larger number of bytes and hence a larger word size than can be accommodated by the processors. The accommodation is made by using transfer buffers for storage of the excess bits both before and after transfer over the data bus so that each additional byte over and above the number normally handled by the processor can be utilized after the bus has been transferred for utilization by another processor.

Thus, the present invention provides a data communications system for transferring logically related pieces of information between a plurality of independently and asynchronously operated processors and a resource. The system includes a data bus which interconnects the processors and the resource by interconnecting the local buses associated with the processors. The data bus is designed to be capable of transferring in parallel a particular number of bits, constituting a plurality of data words. The particular number will be an integral multiple of the bit length (herein called a byte or one word) provided by the natural transfer mechanism of the processors.

A latch means is associated with each processor and connected between the local buses and the data bus so that it can serve to store temporarily the bits which have been simultaneously transferred over the data bus and which are to be sequentially transferred over the local bus or vice versa. There is also provided control logic associated with each of the processors which is operative to request the transfer of data over the bus. Also, there is provided bus arbitration logic operable to assign access to the bus to one of the processors and resource in accordance with a predetermined set of priorities.

It is an object of the present invention to provide a bus structure in a multi-processor shared resource configuration such that the access time required for the bus to accomplish a transfer of a full block of data will be minimized.

It is another object of this invention to provide a means for transferring in parallel over a data bus a number of bits of data which exceeds the bit rate of the processors connected to the bus so that several bytes may be processed by the processors without additional access to the bus being required.

DESCRIPTION OF THE PREFERRED EMBODIMENT

Figure 1:
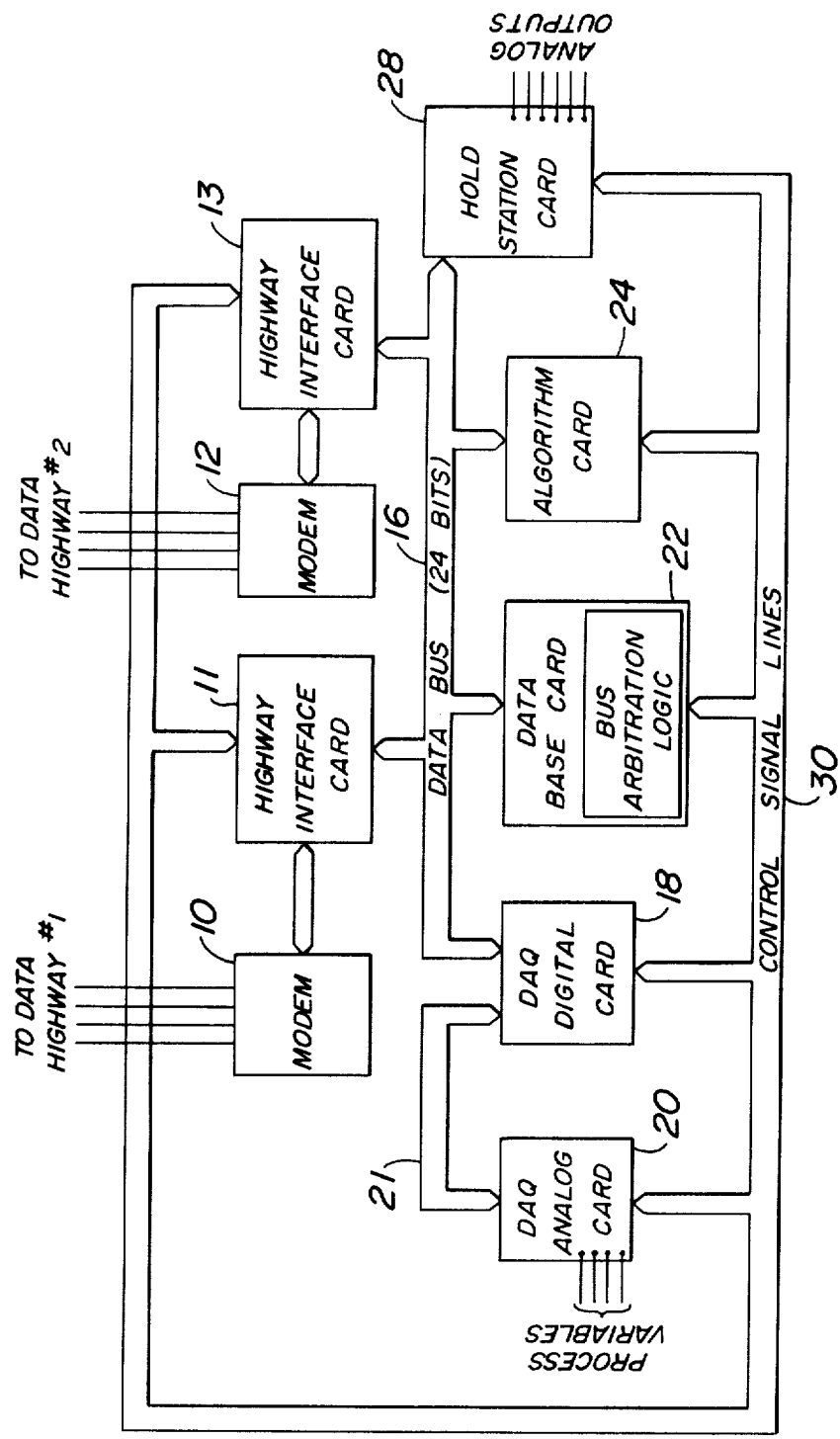
FIG. 1 is a block diagram of a microprocessor based multi-loop process controller showing several printed circuit cards making up the controller.

Referring to FIG. 1, there is shown in block diagram form an arrangement and interconnection of printed circuit cards having the functions described below as required to provide a controller for connection to a data highway. The controller described in connection with FIG. 1 is useful as a multiloop controller in a distributed control system. Thus, in industrial control applications where a large number of control loops must be serviced and where it is desired to decentralize the function of providing such control a distributed control system is useful. In such a system a number of controllers such as that shown in FIG. 1 can be connected to a data highway so that the controllers can be in communication with each other and with a large central computer. Thus, in FIG. 1 the data highways No. 1 and No. 2 are redundant highway networks connecting all of the controllers and a central computer for providing a distributed control system.

The connection of the digital controller to the data highways is provided by way of the modems 10 and 12. The modem cards serve to convert data from the highway interface cards 11 and 13 respectively into a modulated signal which may be sent on the data highway and to demodulate signals from the data highway before sending them to the highway interface cards.

The highway interface cards 11 and 13 receive data from the data bus 16. The data bus 16, as noted, may, for example, be suitable for carrying 24 bits in parallel. The data bus, of course, serves to provide an intercommunication channel between the various printed circuit cards which make up the controller and, as shown in FIG. 1, the data bus is connected not only to the highway interface cards but also to the data acquisition digital card, the data bus card, the algorithm card, and the hold station card. The data acquisition digital card 18 includes a microprocessor and the necessary logic circuitry so that it can perform the function of acquiring digital input data from the data acquisition analog card 20 over the bus 21 so that the information acquired can be transmitted to the data base card 22, the algorithm card 24, or to the hold station card 28.

The data base card 22 may, for example, include CMOS RAM storage such as may be required to provide information as to the algorithm which is to be used for the control. The data base serves as one of the resources for the controller of FIG. 1 and provides the central memory storage needed to operate the system. The other resource of FIG. 1 is provided by hold station card 28 which, as shown in FIG. 1, provides analog outputs to the control devices used to operate the process under control. The hold station card contains a number of digital to analog converters for the purpose of converting the digital information supplied over data bus 16 to analog form as, for example, to a current output indicative of the position required for the process control devices being operated.

The hold station card is under the control of the algorithm card 24. The algorithm card itself includes a microprocessor and logic circuitry as required to execute the control algorithms which are to be used for the control functions of the controller of FIG. 1. After the algorithm card has used the particular algorithm to determine the algorithm output required for control, the algorithm card writes the digital form of these outputs to the main data base on card 22 and also to the hold station card 28.

It will be noted that the analog inputs in the form of process variables, as measured in the process under control, are provided as inputs to the data acquisition analog card 20, which is shown as being connected over bus 21 to the data acquisition digital card 18. The various cards 11, 13, 18, 20, 22, 24, and 28, are all interconnected by way of control lines 30 which provide for the intercommunication between the various cards of the several control signals required to provide the necessary control of the operations of the various cards involved.

As has been mentioned above, the highway interface cards 11 and 13, the data acquisition digital card 18, as well as the algorithm card 24, all contain microprocessors which must communicate with each other for the proper operation of the system and which must, in some circumstances, communicate with the data base card 22, or the hold station card 28, which act as resources for the system. For this intercommunication, the data bus 16 is provided.

If, as is likely to be the case, the microprocessors of the several cards mentioned above are eight bit processors connected to 8 bit local buses, that is, processors having a natural transfer mechanism such that the words transferred are 8 bits in length, then it will be evident that there is a problem presented with the connection to 24 bit data bus 16. This problem relates to the timing of the transfer of the 24 bit wide words used in the resources to the local bus for maximum utilization of the data bus as between the several cards which will be seeking access to the data bus either to write or to read from it. Thus, the matter of access to the data bus is a problem to be solved, as well as the matter of providing an efficient transfer of 24 parallel bits between 8 bit processors.

The method of providing efficient intercommunication over the data bus 16 of FIG. 1 can be best illustrated by considering a particular circuit arrangement such as that which may be used in the algorithm card 24. In this connection, reference should be made to FIG. 2, which shows in block diagram form a circuit for the algorithm card. This card includes a central processing unit 40 which may, for example, be a microprocessor which receives data over the 8 bit bus 42 and produces address signals on a 16 bit bus 44 and the necessary control signals on the control lines 46 while responding to an "interrupt" signal from line 48 and a "wait" signal from line 50, as well as a "reset" signal from line 52 that may be initiated by the reset circuit 54.

Figure 2:
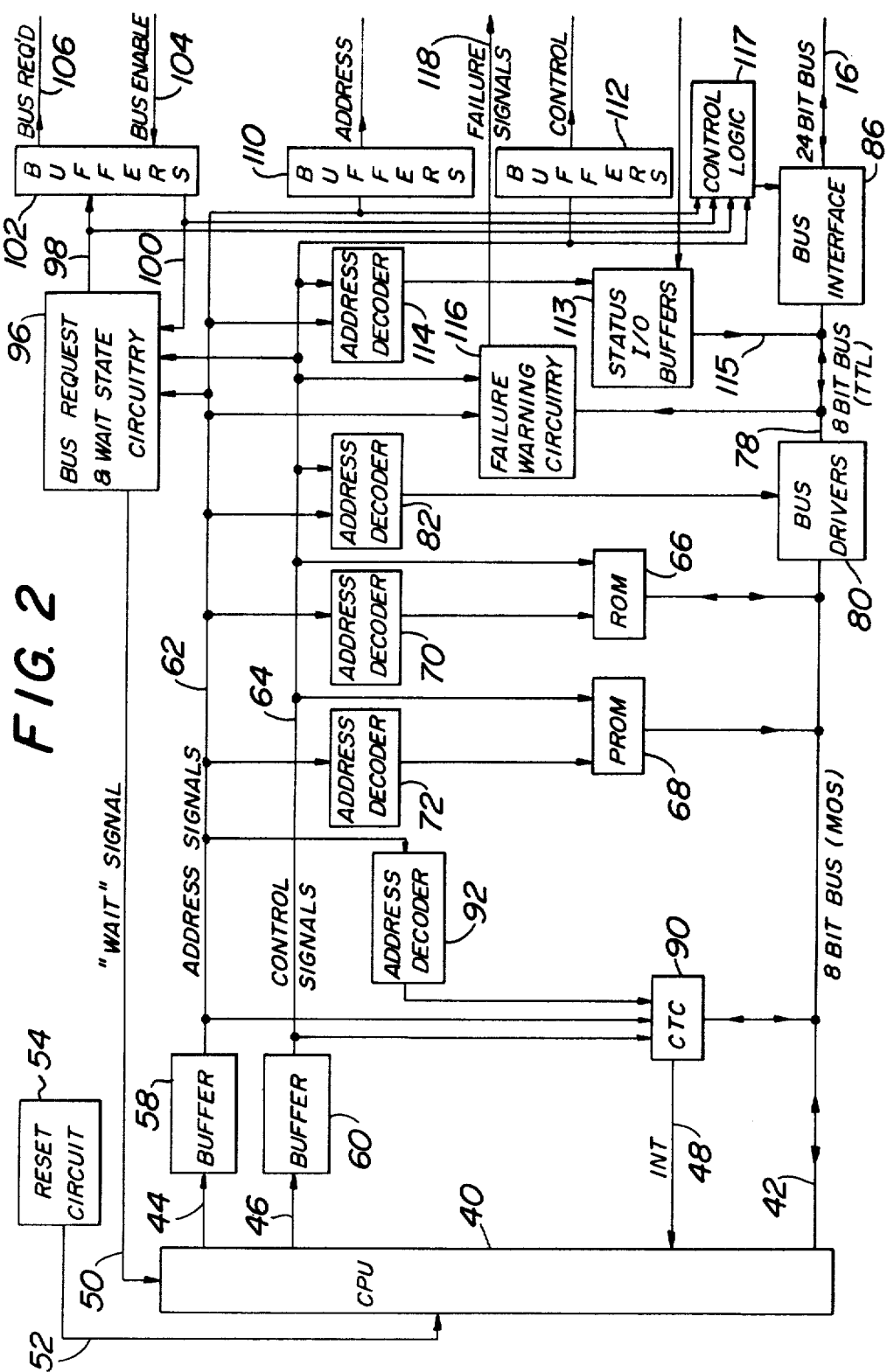
FIG. 2 is a block diagram of the algorithm card of FIG. 1.

The address signals produced on line 44 after being buffered by the buffer 58 can, when used in combination with the control signals from line 46 after they have been buffered by buffer 60, produce on the respective lines 62 and 64 the address signals and control signals necessary to provide the various functions on the algorithm card of FIG. 2. Among these functions may be the function of storage as is provided by the ROM 66 and the PROM 68 which are respectively responsive to the address signals as decoded by the address decoders 70 and 72, as well as the control signal from line 64. They thus provide the on-card storage for the algorithm card of FIG. 2 and may be used, for example, to store the algorithm required by the controller for effecting the type of control desired. The outputs of the ROM and PROM can, of course, be used by the central processing unit which receives the data from them over the 8 bit bus 42.

It will be noted that the 8 bit local bus 42 is designated "MOS" while the 8 bit local bus 78 is designated "TTL". The bus 42 is designed to carry the MOS loads while the bus 78 is designed to carry the TTL loads. The interface between those two buses is by way of the bus drivers 80 which, in response to the address and control signals from lines 62 and 64 respectively, as provided to the address decoder 82, can be effective to cause the bus driver 80 to provide the necessary interface between the two buses so as to prevent overloading by the various elements of the circuit. The 24 bit data bus 16 which supplies the intercommunication between the algorithm card of FIG. 2 and the other cards of the controller, as shown in FIG. 1, is interfaced with the 8 bit local bus 78 by way of the bus interface 86 which will be described more fully in the description of FIG. 3.

The timing of the functions of the algorithm card of FIG. 2 is provided by the central timing circuit 90 which is addressed by way of address decoder 92 and by way of other connections from the address bus 62 and the control signal lines 64 respectively so that there can be supplied on line 48 to the central processing unit 40 the necessary "interrupt" signal to interrupt the operation of the processor and provide the proper timing of its function.

In addition to the interrupt circuits on line 48, the functioning of the central processing unit is also altered by the "wait" signals from line 50 which are produced by the circuitry of block 96 indicated on FIG. 2 as being the Bus Request and Wait State circuitry. The circuitry of block 96 provides in response to the address signals from lines 62 and the control signals from lines 64 the necessary "bus request" signals on line 98 as well as the necessary "wait" signals on line 50.

As shown in FIG. 2, the circuit of block 96 responds not only to the address signals and the control signals of the lines 62 and 64, respectively, but also to the bus "enable" signals on line 100 which are provided as one of the outputs of the buffers 102 in response to "bus enable" signals provided on line 104. The buffers 102 also operate to buffer the signals from line 98 to line 106 which carries the "bus request" signals.

The circuitry of block 96 thus will respond to the appropriate address and control signals indicating that a request should be made for connection of the algorithm card to the data bus 16. In response to such an address, a "bus request" signal is generated on line 98 and hence on line 106. That "bus request" signal then will go by way of one of the control lines 30 of FIG. 1 from the algorithm card 24 to the data base card 22 since the data base card 22 will be assumed to include a bus arbitration circuit whose function would be to determine if the algorithm card 24 should be given permission to connect to the data bus 16 depending upon the other requests that have been made for the data bus and the relative priority of the algorithm card 24 as compared with the other requests. If the logic circuitry of the bus arbitration circuit decides that the algorithm card should be granted the request, a "bus enable" signal will then be supplied by way of the control lines 30 to the "bus enable" line 104 and through buffers 102 to line 100 and to the Bus Request and Wait State circuitry of block 96. Receipt of a "bus enable" signal on line 104 will make possible, through circuitry not shown, the enabling of the buffers 110 and 112 so that address signals from line 62 may be sent to the data base card and so that control signals from line 64 may also be sent. Also, the "bus enable" signal, by way of circuitry not shown, enables the bus interface circuit 86 to perform its function of interfacing between the 24 bit bus 16 and the 8 bit bus 78.

The algorithm card of FIG. 2 performs its diagnostic functions with the signals provided to the status I/O buffers 113 which respond to inputs from a number of switched circuits wherein the switches are actuated in accordance with the conditions under which the control system is to operate as well as the nature of the additional equipment supplied with it and designed to operate with it. The buffers 113 as shown in FIG. 2 respond to the address and control signals of lines 62 and 64, respectively, by virtue of the address decoder circuit 114. The signals from the status I/O buffers 113 then are supplied by way of the data lines 115 to the TTL bus 78 so that the CPU 40 may read them whenever it is performing diagnostic checks.

The Failure Warning circuitry 116 will respond to address and control signals from lines 62 and 64, respectively, and from the signals from data bus 78 to produce failure signals on line 118 in response to the detection of parity errors or improper operation of the central processing unit as well as other problems which may be logically detected by the circuitry 116 so that the failure signals on line 118 can be sent to other cards of the controller whereby failure of the algorithm card to properly operate can be detected by those other elements and so that these failures can be taken into consideration in the operation of the controller.

Figure 3:
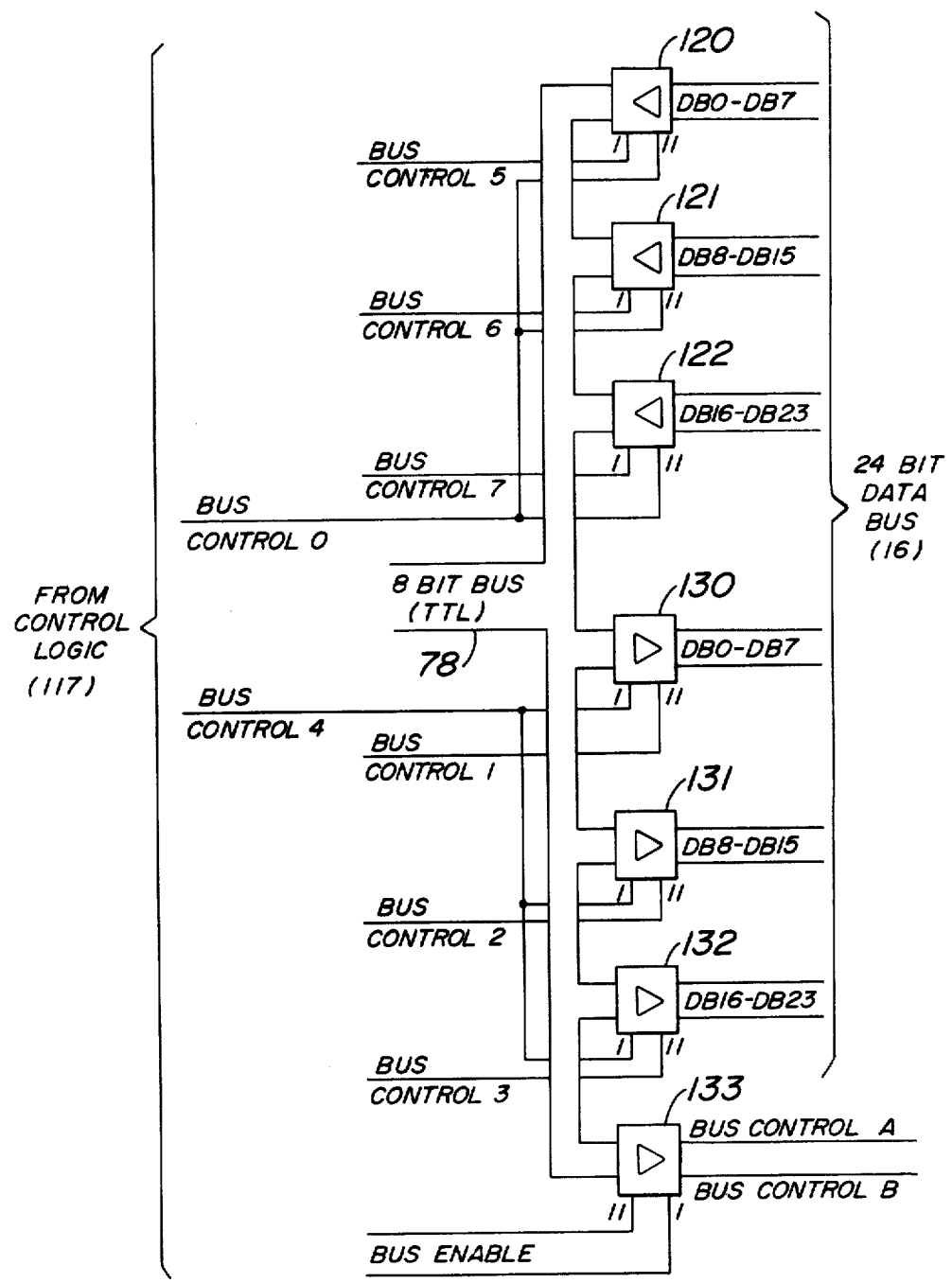
FIG. 3 is a detailed circuit diagram of the bus interface circuit of FIG. 2.

In FIG. 3 there is shown a circuit diagram for one form of the bus interface 86 of FIG. 2. The interface includes a reading latch means including the three latches 120, 121, and 122; a writing latch means which includes latches 130, 131, and 132; and a control latch means 133 all of which are 3-state devices. These latches are operated by bus control signals from the control logic 117. The latches are transparent when pin 1 is low and pin 11 is high, and they are latched when pin 1 is low and pin 11 is low also. In the latched condition, the output of the latch reflects the state of the input just before pin 11 went low. In other words, the output reflects the previously latched data. Also, if pin 1 is high and pin 11 is high, the outputs are 3-state but they are being read into the internal latches while if pin 1 is high and pin 11 is low, the outputs are 3-state but the internal latches contain the input just before pin 11 went low.

As shown in FIG. 3, the data input to the three latches 120, 121, and 122 is such that there are eight bits input to each latch as indicated by the consecutive data bits DB 0-DB 7 for latch 120, DB 8-DB 15 for latch 121, and DB 16-DB 23 for latch 122. Thus, when "bus control 0" is low, latches 120, 121, and 122 are such as to ensure that the data DB 0-DB 23 enter the latches 120, 121, and 122 while the CPU is in its read cycle "wait" state, that is, while the CPU is in its read cycle and a "wait" signal has been sent to the CPU on line 50 of FIG. 2 causing the CPU to wait for the period required to execute the read cycle. The 24 bits of data DB 0-DB 23 are then latched into latches 120, 121, and 122 after the CPU exits from the "wait" state.

The operation of the circuit of FIG. 3 to accomplish off-card reads is as set forth below.

The central processing unit first requests access to the data bus for the purpose of performing a read from the data base to the central processing unit. That read may selectively be for one, two, or three bytes of a total of three bytes or words of data in each data block. The data block, of course, may include other bytes for control purposes. Whether the read is for one, two, or three bytes from the data base, however, only those which are intended to be read are transferred to the 8 bit TTL bus.

Following the request for access to the data base by the CPU, a "wait" signal is generated by the wait state circuitry to cause the central processing unit to wait a predetermined period of time for the transfer to be accomplished over the bus. The bus drivers 80 become enabled for data flow from the TTL to the MOS bus and the signal "bus control 6" thus goes low so as to enable latch 121 so that an output from 121 appears on the TTL bus. The signal "bus control 5" and signal "bus control 7" remain high. The bus arbitration circuitry of the data base card sends "bus enable" signals when the central processing unit is in the "wait" state. The "enable" signal indicates to the algorithm card that the access to the bus has been granted. Then the data bus sends 24 bits of data to the algorithm card (DB 0-DB 23). Bus control 0 then goes high and the 24 bits being sent by the data base card are read into latches 120, 121, and 122. Only the byte being read into latch 121 appears on the TTL bus since latch 121 is transparent and latches 120 and 122 are not. The byte of data being sent through latch 121 also goes through the bus drivers 80 to the MOS bus from which the data is read by the central processing unit, the "wait" signal having been withdrawn.

"Bus control 0" then goes low causing latches 120, 121, and 122 to latch the 24 bytes of data from the data base. The data on the TTL and MOS bus continues to be that from latch 121. Before "bus control 0" went low they were being read transparently through latch 121. However, after "bus control 0" went low, the data of 121 was the same data but the data has at that time been latched into 120, 121, and 122.

The data base then makes the data go away and bus control 6 goes high causing 121 to go 3-state thus causing the TTL and MOS buses to lose data.

To transfer each subsequent byte that may be desired to be read, the bus drivers become enabled in the TTL to MOS bus direction. "Bus control 7" then goes low to enable it from latch 122 which then outputs the previously latched data so that it can flow through the bus drivers to the MOS bus. The CPU then reads that data from the MOS bus and the drivers then become disabled. The next transfer, if another one is desired, would be from latch 120 and it would be accomplished in the same manner as set forth above for latch 122, except in this case the signal "bus control 5" would enable the output of the latch 120.

The process of carrying on a write to an off-card address such as to the data base card follows the sequence set forth below. This write may be either a 1, 2, or 3 byte write. However, as is the case with a read, it must be kept in mind that the transfer over the 24 bit data bus 16 always includes 3 bytes. A writing latch means for writing includes latches 130, 131, and 132 in FIG. 3. There is also included in FIG. 3 a control latch means, namely latch 133, which is for the purpose of generating the "bus control A" and the "bus control B" signals which are sent to the data base to indicate whether the write is to be either a 1, 2, or 3 byte write so that appropriate procedures can be carried on by the data base to read the write appropriately.

As shown in FIG. 3, the latch 130 is effective to transfer data bytes DB 0-DB 7 under control of the signals "bus control 4" and "bus control 1", while the latch 131 is effective to transfer the data signals DB 8-DB 15 under the control of the signals "bus control 4" and "bus control 2". In addition, latch 132 is effective to transfer the data bytes DB 16-DB 23 under control of "bus control 4" and "bus control 3".

During a write to an off-card address "bus control 4" goes low enabling the outputs of 130, 131, and 132. Thus, all three bytes from these three latches are sent to the data base at once. However, before the algorithm card does such a write, it writes to latch 133 to produce the appropriate "bus control A" and/or "bus control B" signals which, as mentioned before, are sent to the data base to indicate the type of write involved. Thus, the data base decides which of the three bytes being sent by the algorithm card should be used and which should be ignored.

The circuit operation of FIG. 3 during a single byte write is like the last parts of a two byte write. As mentioned, there is a transfer during a single byte write of three bytes of data from 130, 131, and 132 with the setting of the bus control latch 133 instructing the data base as to which bytes to ignore.

Since both bytes in a two byte write, for example, are sent to the data base at once, and since the central processor unit has only eight data lines, one of the two bytes must be written on a latch 130, 131, or 132 before the write to the off-card address takes place. During the write to the off-card address both the byte at the off-card address and the previously latched byte are sent to the data base. The procedure for such a two byte word would be as follows. First control data is written to the bus control latch 133 then the byte with the higher address is written to the appropriate latch. Byte 0 is written to latch 130 and byte 1 to latch 131, then byte 2 is written to latch 132. Then the byte with the lower address is written to its off-card address. This write will, of course, result in the latched bytes being sent to the data base also.

The timing of the off-card write is similar to the timing of the read previously discussed in that the central processing unit first requests access to the data bus and that request is subsequently acknowledged with a grant of access by the generation of a "bus enable" signal by the bus arbitration circuitry of the data base. The bus drivers are then enabled and the CPU puts data on the MOS bus and it then appears on the TTL bus. "Bus control 3" goes high to allow latch 132 to read in the data from the TTL bus then "bus control 3" goes low causing the byte to latch 132 to latch the data from the TTL data bus. This is followed by the bus drivers becoming enabled to remove TTL data from the data bus and the CPU removed from the MOS bus.

What is claimed is:

1. A data communications system for transferring logically related pieces of information between the local buses connected to each of a plurality of independently operated processors and a resource, comprising:

a data bus interconnecting the local buses of said processors and said resource, said data bus being capable of carrying in parallel a number of bytes each having bit length corresponding to that of the natural transfer mechanism of said processors;

reading latch means associated with each processor and connected between the processors' local bus and said data bus for storing all of the bytes being simultaneously transferred over said data bus; and control logic means including,
means operable during a first part of a read from the data bus by a processor to cause the latch means for said processor to latch up all simultaneously transferred bytes from said data bus while allowing one of said simultaneously transferred bytes to go to the local bus connected to said latch means, and
means operable during a subsequent part of a read to transfer latched data of another of said simultaneously transferred bytes to said local bus.

2. A data communications system for transferring logically related pieces of information between the local buses connected to each of a plurality of independently operated processors and a resource, comprising:

a data bus interconnecting the local buses of said processors and said resource, said data bus being capable of carrying in parallel a number of bytes each having a bit length corresponding to that of the natural transfer mechanism of said processors;

writing latch means associated with each processor and connected between the processor's local bus and said data bus for storing all of the bytes to be transferred simultaneously from the local bus over said data bus;

control latch means associated with each processor and having bus control signal outputs connected to the resource to which writing is required and local bus connections receiving control data from said local bus; and control logic means in said system operable during a write to the data bus by a processor to cause the writing latch means for said processor to sequentially latch up from said local bus all bytes to be transferred during said write for simultaneous transfer over said data bus during the period when the last of said sequentially latch bytes is being transferred from said local bus.

3. A data communications system for transferring logically related pieces of information between the local buses connected to each of a plurality of independently operated processors and a resource, comprising:

a data bus interconnecting the local buses of said processors and said resource, said data bus being capable of carrying simultaneously in parallel a number of bytes which have a bit length corresponding to that of the natural transfer mechanism of said processors, reading latch means associated with each processor and connected between the processors' local bus and the data bus for storing all of the bytes simultaneously transferred over said data bus, writing latch means used with each processor and connected between the processors' local bus and said data bus for sequentially storing all of the bytes from the local bus to be simultaneously transferred over said data bus, control latch means associated with each processor so as to provide bus control signal outputs to said resource when writing to said resource is to be accomplished and also to be provided with local bus connections for receiving control data from said local bus for control of the reading operation in said resource, and control logic means connected to said reading latch means, said writing latch means and said control latch means including, first means operable during a first part of a read from the data bus by a processor to cause said reading latch means for such processor to latch up all simultaneously transferred bytes from said data bus while allowing one of the simultaneously transferred bytes to go to the processor which is reading;

second means operable during subsequent parts of a read from the data bus to transfer the latched data of another of said simultaneously transferred bytes from said local bus to said reading processor, and third means operable during a write to the data bus by the processor to cause the writing latch means for said processor to latch up all bytes sequentially supplied from the local bus of said processor so that all said bytes may be simultaneously transferred over said data bus during the period of transfer of the last byte from said local bus.

* * * * *